(12) United States Patent
Haberecht et al.

(10) Patent No.: US 8,901,066 B2
(45) Date of Patent: Dec. 2, 2014

(54) BRANCHED POLYESTERS WITH SULFONATE GROUPS

(75) Inventors: Monika Haberecht, Ludwigshafen (DE); Juergen Detering, Limburgerhof (DE); Bernd Bruchmann, Freinsheim (DE); Helmut Witteler, Wachenheim (DE); Heike Weber, Mannheim (DE); Karl Kolter, Limburgerhof (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/495,512

(22) Filed: Jun. 13, 2012

(65) Prior Publication Data

US 2012/0322950 A1    Dec. 20, 2012

Related U.S. Application Data

(60) Provisional application No. 61/497,120, filed on Jun. 15, 2011.

(51) Int. Cl.
| | | |
|---|---|---|
| *C11D 3/37* | (2006.01) | |
| *C11D 1/00* | (2006.01) | |
| *B08B 3/04* | (2006.01) | |
| *C08G 63/91* | (2006.01) | |
| *C02F 5/10* | (2006.01) | |
| *C08G 63/688* | (2006.01) | |

(52) U.S. Cl.
CPC . *C02F 5/10* (2013.01); *C11D 3/378* (2013.01); *C08G 63/918* (2013.01); *C08G 63/6884* (2013.01)
USPC ........... 510/475; 510/276; 510/476; 510/492; 525/344; 525/447; 8/127

(58) Field of Classification Search
USPC .......... 525/344, 447; 510/276, 475, 476, 492; 8/137
See application file for complete search history.

(56) References Cited

U.S. PATENT DOCUMENTS

| | | | | |
|---|---|---|---|---|
| 2,454,546 | A * | 11/1948 | Bock et al. ............... | 525/447 |
| 3,563,903 | A * | 2/1971 | Schmadel et al. ......... | 510/361 |
| 4,150,216 | A | 4/1979 | Quack et al. | |
| 4,167,395 | A | 9/1979 | Engelhardt et al. | |
| 5,281,630 | A | 1/1994 | Salsman | |

| | | |
|---|---|---|
| 2012/0053303 A1 | 3/2012 | Djuric et al. |
| 2012/0129749 A1 | 5/2012 | Detering et al. |
| 2012/0129750 A1 | 5/2012 | Detering et al. |

FOREIGN PATENT DOCUMENTS

| | | |
|---|---|---|
| DE | 26 21 653 A1 | 12/1977 |
| DE | 26 33 418 A1 | 1/1978 |
| DE | 26 37 926 A1 | 3/1978 |
| DE | 39 05 915 A1 | 9/1990 |
| DE | 10 2007 006 630 A1 | 8/2008 |
| WO | WO 2008/013213 A1 | 1/2008 |

OTHER PUBLICATIONS

International Search Report issued Oct. 10, 2012, in PCT/EP2012/061291 (with English Translation of Categories of Cited Documents).
U.S. Appl. No. 13/569,538, filed Aug. 8, 2012, Detering, et al.
U.S. Appl. No. 13/495,444, filed Jun. 13, 2012, Haberecht, et al.
U.S. Appl. No. 13/545,534, filed Jul. 10, 2012, Detering, et al.
Andreas Domsch et al., "Chapter 9: Sulfosuccinates", Anionic Surfactants, Organic Chemistry, edited by H. W. Stache, Marcel Dekker, New York, 1996, 51 Pages.

* cited by examiner

*Primary Examiner* — Randy Gulakowski
*Assistant Examiner* — Christopher M Rodd
(74) *Attorney, Agent, or Firm* — Oblon, Spivak, McClelland, Maier & Neustadt, L.L.P.

(57) ABSTRACT

Branched polyesters with sulfonate groups can be obtained by reacting components A, B, optionally C, and optionally D to yield branched polyesters, then reacting these branched polyesters with hydrogen sulfite. Component A is at least one $\alpha,\beta$-olefinically unsaturated dicarboxylic acid, component B is at least one di- or higher-functional alcohol, optional component C is at least one di- or higher-functional carboxylic acid or hydroxycarboxylic acid without an $\alpha,\beta$-olefinically unsaturated bond, and optional component D is at least one compound of formula $CH_3(-O-CH_2-CH_2)_n-OH$. In reacting the branched polyesters with hydrogen sulfite, a molar amount of hydrogen sulfite is at most 95 mol %, based on an amount of $\alpha,\beta$-olefinically unsaturated dicarboxylic acid.

10 Claims, No Drawings

BRANCHED POLYESTERS WITH SULFONATE GROUPS

The present invention relates to branched polyesters with sulfonate groups and mixtures comprising branched polyesters with sulfonate groups. The invention further provides a method for producing such branched polyesters. Furthermore, the invention relates to the use of these branched polyesters as deposit inhibitors in water-conveying systems and as additive to rinses, detergents and cleaners, in particular to phosphate-containing and phosphate-free cleaner formulations for machine dishwashing.

Further embodiments of the present invention can be found in the claims, the description and the examples. It goes without saying that the features of the subject matter according to the invention that have been specified above and are still to be explained below can be used not only in the combination specifically stated in each case, but also in other combinations, without departing from the scope of the invention. In particular, also those embodiments of the present invention in which all of the features of the subject matter according to the invention have the preferred or very preferred meanings are preferred or very preferred.

Branched copolyesters comprising sulfonate groups which are soluble or can be dispersed in water are known from DE 26 21 653 A1. These branched copolyesters are suitable, according to DE 26 21 653 A1, as leveling auxiliaries in polyester dyeing, in particular for rapid dyeing methods, as hair-setting compositions, as sizes, as water-soluble adhesives and as additive for adhesives, and also as modifiers for melamine resins or other aminoplastic resins.

DE 26 33 418 A1 describes hair treatment compositions with a content of water-soluble or -dispersible branched copolyesters comprising sulfonate groups.

DE 26 37 926 A1 describes water-soluble or -dispersible and branched copolyesters comprising sulfonate groups with an application spectrum comparable to DE 26 21 653 A1.

U.S. Pat. No. 5,281,630 describes a prepolymer based on a terephthalic polymer, glycol and oxyalkylated polyol, which is reacted with $\alpha,\beta$-unsaturated dicarboxylic acids and is then sulfonated.

Alemdar et al. describe in Polymer 51 (2010), pp. 5044-5050, the production of unsaturated polyesters using boric acid as catalyst and sulfonated derivatives of the unsaturated polyesters as biodegradable polymeric surface-active substances.

DE 39 05 915 A1 relates to a coating composition comprising addition polymers, crosslinking agents and an acid catalyst. Hydroxyl-comprising succinic acid diestersulfonic acids and succinic acid polyestersulfonic acids are described as acid catalysts.

Simple sulfosuccinates, for example mono- or dialkyl sulfosuccinates or sulfosuccinamides, have already been well-known to the person skilled in the art from the prior art since 1930. These sulfosuccinates are used, for example, in cleaning compositions, pharmaceuticals, adhesives or coatings. However, polymeric sulfosuccinates are barely used.

An overview of the fields of use of sulfosuccinates can be found, for example, in Anionic Surfactants: Organic Chemistry, edited by H. W. Stache, Marcel Dekker, New York, 1996: Chapter 9: Sulfosuccinates by A. Domsch, and B. Irrgang.

Polymers of carboxyl-group-containing and/or sulfonic acid-group-containing monomers obtainable by radical polymerization have been an important constituent of phosphate-containing and phosphate-free machine dishwashing detergents for some years. As a result of their soil-dispersing and deposit-inhibiting effect, they make a considerable contribution to the cleaning and clear-rinse performance of machine dishwashing detergents. They ensure that no salt deposits of the hardness-forming calcium and magnesium ions remain on the ware. Copolymers of acrylic acid and 2-acrylamido-2-methylpropanesulfonic acid are often used for this purpose.

These polymers are also used in water-conveying systems as agents for preventing mineral deposits such as e.g. calcium and magnesium sulfate, magnesium hydroxide, calcium and barium sulfate and calcium phosphate on heat-transfer areas or in pipelines. Water-conveying systems to be mentioned here are, inter alia, cooling and boiler-feed water systems and industrial process waters. However, these polymers are also used as deposit inhibitors in seawater desalination by distillation and by membrane processes such as reverse osmosis or electrodialysis.

A disadvantage of these polymers of carboxyl-group-containing and/or sulfonic acid-group-containing monomers obtainable by radical polymerization is that they are not biodegradable. Biodegradable polymers such as, for example, polyaspartic acid, however, have proven to be not really commercially acceptable on account of high production costs.

It was therefore the object of the invention to provide substances which can be used for cleaning purposes, in particular as additive to phosphate-containing and phosphate-free cleaner formulations for machine dishwashing, and for the purpose of deposit inhibition in water-conveying systems, and which are readily biodegradable. The object of the invention was also to provide polymeric effect substances by means of a technically simple and cost-effective method which have a large number of carboxyl groups and/or sulfonic acid groups and consist of monomers of low toxicity and good biodegradability. It was a further object of the invention to provide substances which can easily be incorporated into formulations for cleaning purposes in their various presentation forms.

As is evident from the disclosure of the present invention, these and other objects are achieved by the various embodiments of the branched polyesters with sulfonate groups according to the invention, which are obtainable by a. the reaction of the components A, B, optionally C and optionally D to give branched polyesters, where
  i. the component A is selected from the group of $\alpha,\beta$-olefinically unsaturated dicarboxylic acids ($A_2$), and
  ii. the component B is selected from the group of di- or higher-functional alcohols ($B_y$),
  iii. the optional component C is selected from the group of di- or higher-functional carboxylic acids ($A_x$) and hydroxycarboxylic acids ($A_xB_y$) without $\alpha,\beta$-olefinically unsaturated bonds,
  iv. the optional component D is selected from the compounds of the formula $CH_3(-O-CH_2-CH_2)_n-OH$, where n corresponds to an integer from the range from 2 to 40,
  with the proviso that
  if only difunctional alcohols ($B_2$) are selected as component B, the component C is present in the reaction (a.) and is selected from the group of tri- or higher-functional carboxylic acids ($A_x$) and tri- or higher-functional hydroxycarboxylic acids ($A_xB_y$) without $\alpha,\beta$-olefinically unsaturated bonds b. and the subsequent reaction of the branched polyesters obtained in (a.) with hydrogen sulfite, where the molar amount of hydrogen sulfite is at most 95 mol %, based on the amount of $\alpha,\beta$-olefinically unsaturated dicarboxylic acid ($A_2$).

In the reaction of the components A, B, optionally C and optionally D to give branched polyesters, it is of course also possible to use mixtures of different components A, mixtures of different components B, optionally mixtures of different components C and/or optionally mixtures of different components D. Preference is given to using mixtures with up to three different components A, mixtures with up to three different components B and/or optionally mixtures with up to three different components C. Particular preference is given to using mixtures with up to two different components A, mixtures with up to two different components B and/or optionally mixtures with up to two different components C. In particular, in the reaction of the components A, B, optionally C and optionally D to give branched polyesters, preference is given to using in each case one compound A, B and optionally C.

The carboxylic acids ($A_x$) of component C carry no sulfonic acid or sulfonate groups.

The branched polyesters with sulfonate groups of the invention are preferably dendritic, in particular hyperbranched, polyesters.

The term dendritic polymer or else highly branched polymer is the generic term for a series of different branched molecular structures. It covers, for example, dendrimers, star polymers and hyperbranched polymers.

Dendrimers are formed starting from a center (as a rule a small molecule with a plurality of reactive end groups), onto which, through a constantly repeating controlled reaction sequence, generation upon generation of a branching monomer is attached. Thus, with each reaction step, the number of monomer end groups in the resulting dendrimer increases exponentially. A characteristic feature of the dendrimers is the number of reaction stages (generations) carried out in their construction. On account of the uniform structure (in the ideal case all of the branches comprise exactly the same number of monomer units), dendrimers are essentially monodisperse, i.e. they generally have a defined molar mass. Molecularly as well as structurally uniform highly branched polymers are referred to below as dendrimers for consistency.

Within the context of this invention, "hyperbranched polymers" are highly branched polymers which, in contrast to the dendrimers specified above, are both molecularly and also structurally nonuniform. Hyperbranched polymers therefore have a nonuniform molar mass distribution (polydispersity). To produce hyperbranched polymers, a distinction is made between various synthesis strategies. An overview of possible synthesis methods can be found in C. Gao, D. Yan, Prog. Polym. Sci. 29 (2004), 183.

As regards the definition of dendritic and hyperbranched polymers, see also P. J. Flory, J. Am. Chem. Soc. 1952, 74, 2718 and H. Frey et al., Chemistry—A European Journal, 2000, 6, No. 14, 2499.

Dendritic polymers can be characterized via their "degree of branching". As regards the definition of the "degree of branching", reference is made to H. Frey et al., Acta Polym. 1997, 48, 30. The degree of branching DB here is defined as DB (%)=(T+Z)/(T+Z+L)×100, where T is the average number of terminally bonded monomer units, Z is the average number of monomer units forming branches, L is the average number of the linearly bonded monomer units.

Dendrimers have in general a degree of branching DB of at least 99%, specifically 99.9 to 100%.

Hyperbranched polymers preferably have a degree of branching DB of from 10 to 95%, preferably 25 to 90% and in particular 30 to 80%.

The branched polyesters used according to the invention preferably have a degree of branching (DB) per molecule of from 10 to 95%, preferably from 10 to 90%, particularly preferably from 10 to 80%, and in particular 20 to 80%.

Within the context of this invention, hyperbranched polyesters with or without sulfonate groups are understood as meaning uncrosslinked polyesters with or without sulfonate groups which are both structurally and molecularly nonuniform. Within the context of this specification, uncrosslinked means that a degree of crosslinking of less than 15% by weight, preferably of less than 10% by weight, determined over the insoluble fraction of the polymer, is present.

The insoluble fraction of the polymer was determined by extraction for four hours in a Soxhlet apparatus with a solvent in which the polymer is soluble, for example tetrahydrofuran, dimethylacetamide or hexafluoroisopropanol, preferably tetrahydrofuran. After drying the residue to constant weight, the remaining residue is weighed.

In a preferred embodiment, the branched polyesters with sulfonate groups according to the invention are obtained using component D, where preferably less than 20 mol % of component D, based on the total amount of components A, B, C and D, are used. Very particular preference is given here to using less than 10 mol % of component D. Preferably, component D is selected from the compounds of the formula $CH_3(-O-CH_2-CH_2)_n-OH$, where n corresponds to an integer from the range from 2 to 30, particularly preferably from 2 to 25.

In a further preferred embodiment of the branched polyesters with sulfonate groups, in step a. the fraction of the tri- or higher-functional components B and/or C in the mixture with the difunctional components B and/or C is from 50 to 100 mol %, preferably from 70 to 100 mol % and very particularly preferably from 80 to 100 mol %, based on the total amount of components B and/or C.

In a further preferred embodiment of the branched polyesters with sulfonate groups, in step a. the fraction of the tri- or higher-functional components B and/or C is at least 30 mol %, based on the total amount of the components A, B, C and D, particularly preferably at least 35 mol % and very particularly preferably at least 40 mol %.

In a further preferred embodiment of the branched polyesters with sulfonate groups, in step a., at least 30 mol % of components B and, if present, C are tri- or higher-functional, based on the total amount of components A, B, C and D. Preferably, in this connection, at least 35 mol %, particularly preferably 40 mol % and in particular at least 45 mol %, of the components B and, if present, C are tri- or higher-functional. Preferably, the fraction of the tri- or higher-functional components B and, if present, C, based on the total amount of components A, B, C and D, is at most 90 mol %, preferably at most 80 mol %, very preferably at most 75 mol %.

In a further preferred embodiment of the branched polyesters with sulfonate groups, in step a., at least 5 mol % of components A are used, based on the total amount of components A, B, C and D. Preference is given here to using at least 10 mol %. Preferably, the fraction of component A, based on the total amount of components A, B, C and D, is at most 50 mol %, preferably at most 40 mol %.

Within the context of the branched polyesters with sulfonate groups according to the invention, the amount of hydrogen sulfite in step b. can vary within a wide range depending on the particular application. Further, preference is given to using 10 to 95 mol %, particularly preferably from 20 to 92 mol % and in particular from 30 to 90 mol %, of hydrogen sulfite, based on the amount of α,β-olefinically unsaturated dicarboxylic acids ($A_2$).

The molecular weight of the branched polyesters were determined prior to the reaction with hydrogen sulfite by means of gel permeation chromatography (GPC) compared with polymethyl methacrylate (PMMA) as standard. For this, dimethylacetamide or tetrahydrofuran were used as eluents. The method is described in Analytiker Taschenbuch [Analytical handbook] Vol. 4, pages 433-442, Berlin 1984.

The thus determined weight-average molecular weights ($M_w$) of the polyesters A before the reaction with hydrogen sulfite are in the range from 500 g/mol to 50 000 g/mol, preferably in the range from 750 g/mol to 25 000 g/mol and very particularly preferably in the range from 1000 g/mol to 15 000 g/mol.

The branched polyesters prior to the reaction with hydrogen sulfite have acid numbers of from 10 to 500 mg KOH/g polymer, preferably 15 to 400 mg KOH/g polymer and very particularly preferably 20 to 300 mg KOH/g polymer. The acid number was determined in accordance with DIN 53402.

The branched polyesters A prior to the reaction with hydrogen sulfite have glass transition temperatures in the range from −50 to +50° C., preferably −40 to +40° C. and very particularly preferably −30 to +40° C. The glass transition temperature is determined by means of DSC (Differential Scanning Calorimetry).

Preferably, for the branched polyesters with sulfonate groups, the α,β-olefinically unsaturated dicarboxylic acids ($A_2$) used are maleic acid, itaconic acid, fumaric acid, citraconic acid, mesaconic acid or glutaconic acid. Particular preference is given to maleic acid and itaconic acid, very particularly preferably maleic acid and derivatives thereof such as maleic anhydride.

The dicarboxylic acids ($A_2$) can either be used as such or in the form of derivatives.

Derivatives of the dicarboxylic acids ($A_2$) are preferably understood here as meaning the relevant anhydrides in monomeric or polymeric form,
mono- or dialkyl esters, preferably mono- or di-$C_1$-$C_4$-alkyl esters, particularly preferably mono- or dimethyl esters or the corresponding mono- or diethyl esters,
also mono- and divinyl esters, and
mixed esters, preferably mixed esters with different $C_1$-$C_4$-alkyl components, particularly preferably mixed methyl ethyl esters.

Among these, the anhydrides and the mono- or dialkyl esters are preferred, particular preference being given to the anhydrides and the mono- or di-$C_1$-$C_4$-alkyl esters and very particular preference being given to the anhydrides.

Within the context of this specification, $C_1$-$C_4$-alkyl is methyl, ethyl, isopropyl, n-propyl, n-butyl, isobutyl, sec-butyl or tert-butyl, preferably methyl, ethyl and n-butyl, particularly preferably methyl and ethyl and very particularly preferably methyl.

Within the context of the present invention, it is also possible to use a mixture of a dicarboxylic acid and one or more of its derivatives. Equally, within the context of the present invention, it is possible to use a mixture of two or more different derivatives of one or more dicarboxylic acids.

For the branched polyesters with sulfonate groups as difunctional alcohols ($By=B_2$), preference is given to using
ethylene glycol, propane-1,2-diol, propane-1,3-diol, butane-1,2-diol, butane-1,3-diol, butane-1,4-diol, butane-2,3-diol, pentane-1,2-diol, pentane-1,3-diol, pentane-1,4-diol, pentane-1,5-diol, pentane-2,3-diol, pentane-2,4-diol, hexane-1,2-diol, hexane-1,3-diol, hexane-1,4-diol, hexane-1,5-diol, hexane-1,6-diol, hexane-2,5-diol, heptane-1,2-diol, 1,7-heptanediol, 1,8-octanediol, 1,2-octanediol, 1,9-nonanediol, 1,2-decanediol, 1,10-decanediol, 1,2-dodecanediol, 1,12-dodecanediol, 1,5-hexadiene-3,4-diol, 1,2- and 1,3-cyclopentanediols, 1,2-, 1,3- and 1,4-cyclohexanediols, 1,1-, 1,2-, 1,3- and 1,4-bis(hydroxymethyl)cyclohexanes, 1,1-, 1,2-, 1,3- and 1,4-bis(hydroxyethyl)cyclohexanes, neopentyl glycol, (2)-methyl-2,4-pentanediol, 2,4-dimethyl-2,4-pentanediol, 2-ethyl-1,3-hexanediol, 2,5-dimethyl-2,5-hexanediol, 2,2,4-trimethyl-1,3-pentanediol, pinacol, diethylene glycol, triethylene glycol, isosorbide, dipropylene glycol, tripropylene glycol, polyethylene glycols $HO(CH_2CH_2O)_n$—H or polypropylene glycols $HO(CH[CH_3]CH_2O)_n$—H, where n is an integer and n is ≥4, preferably n is an integer from the range from 4 to 40, particularly preferably from 4 to 20, polyethylene polypropylene glycols, where the order of the ethylene oxide or propylene oxide units can be blockwise or random, or polytetramethylene glycols, poly-1,3-propanediols or polycaprolactones with a molecular weight of up to 5000 g/mol, preferably with a molecular weight up to 2000 g/mol.

As difunctional alcohols ($By=B_2$), particular preference is given here to using
ethylene glycol, 1,2-, 1,3- or 1,4-cyclohexanediol, 1,3- and 1,4-bis(hydroxymethyl)cyclohexane, diethylene glycol, triethylene glycol,
or polyethylene glycols having an average molecular weight between 200 and 1000 g/mol.

Preferably, for the branched polyesters with sulfonate groups, the tri- or higher-functional alcohols (By where y is greater than or equal to 3) used are
glycerol, trimethylolmethane, trimethylolethane, trimethylolpropane, bis(trimethylolpropane), trimethylolbutane, trimethylolpentane, 1,2,4-butanetriol, 1,2,6-hexanetriol, tris(hydroxymethyl)-amine, tris(hydroxyethyl)amine, tris(hydroxypropyl)amine, pentaerythritol, diglycerol, triglycerol or higher condensation products of glycerol, di(trimethylolpropane), di(pentaerythritol), tris(hydroxymethyl)isocyanurate, tris(hydroxyethyl)isocyanurate (THEIC), tris(hydroxypropyl)-isocyanurate,
sugars or sugar alcohols such as, for example, glucose, fructose or sucrose, sugar alcohols such as e.g. sorbitol, mannitol, threitol, erythritol, adonitol (ribitol), arabitol (lyxitol), xylitol, dulcitol (galactitol), maltitol, isomalt, or inositol,
tri- or higher-functional polyetherols based on tri- or higher-functional alcohols, which are obtained by reaction with ethylene oxide, propylene oxide and/or butylene oxide,
or tri- or higher-functional polyesterols based on tri- or higher-alcohols, which are obtained by reaction with caprolactone.

The tri- or higher-functional alcohols (By where y is greater than or equal to 3) particularly preferably used here are
glycerol, diglycerol, triglycerol, trimethylolethane, trimethylolpropane, di(trimethylolpropane), pentaerythritol, sucrose or sorbitol, and also polyetherols thereof based on ethylene oxide and/or propylene oxide
and in particular
glycerol, diglycerol, triglycerol, trimethylolethane, trimethylolpropane, pentaerythritol or polyetherols thereof based on ethylene oxide.

Within the context of the present invention, it is also possible to use a mixture of di- or higher-functional alcohols (By).

For the branched polyesters with sulfonate groups, the di- or higher-functional carboxylic acids (Ax) without α,β-olefinically unsaturated bonds preferably are aliphatic dicarboxylic acids, such as oxalic acid, malonic acid, succinic acid, glutaric acid, adipic acid, pimelic acid, suberic acid, azelaic acid, sebacic acid, undecane-α,ω-dicarboxylic acid, dodecane-α,ω-dicarboxylic acid, cis- and trans-cyclohexane-1,2-dicarboxylic acid, cis- and trans-cyclohexane-1,3-dicarboxylic acid, cis- and trans-cyclohexane-1,4-dicarboxylic acid, cis- and trans-cyclopentane-1,2-dicarboxylic acid, cis- and trans-cyclopentane-1,3-dicarboxylic acid aromatic dicarboxylic acids, such as phthalic acid, isophthalic acid or terephthalic acid where the specified dicarboxylic acids can also be substituted, for example by $C_1$-$C_{20}$-alkyl groups or $C_2$-$C_{20}$-alkenyl groups, examples of representatives of substituted dicarboxylic acids or derivatives thereof which may be mentioned are: 2-methylmalonic acid, 2-ethylmalonic acid, 2-phenylmalonic acid, 2-methylsuccinic acid, 2-ethylsuccinic acid, 2-phenylsuccinic acid, 3,3-dimethylglutaric acid, dodecenylsuccinic acid, hexadecenylsuccinic acid, octadecenylsuccinic acid, Furthermore, for the branched polyesters with sulfonate groups, the di- or higher-functional carboxylic acids (Ax) without α,β-olefinically unsaturated bonds which can be used are trimellitic acid and its derivatives, for example its anhydrides and/or ester derivatives, or pyromellitic acid and its derivatives, for example its anhydrides and/or ester derivatives.

The di- or higher-functional carboxylic acids (Ax) can be used either as such or in the form of derivatives.

Derivatives are preferably understood as meaning
the relevant anhydrides in monomeric or polymeric form,
mono- or dialkyl esters, preferably mono- or di-$C_1$-$C_4$-alkyl esters, particularly preferably mono- or dimethyl esters or the corresponding mono- or diethyl esters,
also mono- and divinyl esters, and also
mixed esters, preferably mixed esters with different $C_1$-$C_4$-alkyl components, particularly preferably mixed methyl ethyl esters.

Among these, the anhydrides and the mono- or dialkyl esters are preferred, particular preference being given to the anhydrides and the mono- or di-$C_1$-$C_4$-alkyl esters and very particularly preferably being given to the anhydrides.

For the branched polyesters with sulfonate groups as di- or higher-functional carboxylic acids (Ax) without α,β-olefinically unsaturated bonds, particular preference is given to using aliphatic dicarboxylic acids, such as oxalic acid, malonic acid, succinic acid, glutaric acid, adipic acid, pimelic acid, suberic acid, azelaic acid, sebacic acid, undecane-α,ω-dicarboxylic acid, dodecane-α,ω-dicarboxylic acid, dodecenylsuccinic acid, hexadecenylsuccinic acid or octadecenylsuccinic acid.

Within the context of the present invention, it is also possible to use a mixture of di- or higher-functional carboxylic acids (Ax) without α,β-olefinically unsaturated bonds.

For the branched polyesters with sulfonate groups as hydroxycarboxylic acids ($A_xB_y$) without α,β-olefinically unsaturated bonds, preference is given to using citric acid, the hydrates of citric acid, such as e.g. citric acid monohydrate, hydroxyacetic acid, hydroxypropionic acid, hydroxyvaleric acid, hydroxysuccinic acid, tartaric acid, isocitric acid, dimethylolpropionic acid or dimethylolbutyric acid.

Particular preference is given to using citric acid, its hydrates or tartaric acid.

Within the context of the present invention, it is also possible to use a mixture of hydroxycarboxylic acids ($A_xB_y$).

In a preferred embodiment, the branched polyesters with sulfonate groups are based on a number of different components A, B and C, which is less than or equal to 4, i.e. in step a. 4 or fewer different components A, B and C are used. Preferably, the number of different components A, B and C is 3. The number of different components A, B and C is of course at least 2.

In a further preferred embodiment, for the branched polyesters with sulfonate groups, the amount of component A is greater than 20 mol %, preferably greater than 30 mol %, particularly preferably greater than 50 mol %, based on the total amount of carboxylic acids of components A and C together.

A further embodiment of the invention is given by mixtures of the branched polyesters with sulfonate groups according to the invention. Besides the branched polyesters of the invention, such mixtures comprise further constituents such as solvents or surfactants.

These mixtures are preferably cleaners, rinses or detergents or mixtures for water treatment. The branched polyesters of the invention can be incorporated directly into the formulations (mixtures) in their various presentation forms by methods known to the person skilled in the art.

In this connection, mention is to be made of solid formulations such as powders, tablets and liquid formulations.

The invention therefore further provides the use of the branched polyesters with sulfonate groups according to the invention, or mixtures thereof in rinses, cleaners or detergents, in particular in dishwashing detergents.

They can be used particularly advantageously in machine dishwashing detergents. They are characterized here in particular by their deposit-inhibiting effect both towards inorganic and also organic deposits. In particular, they inhibit deposits of calcium and magnesium carbonate and calcium and magnesium phosphates and phosphonates. Additionally, they prevent deposits which originate from the dirt constituents of the wash liquor, such as grease, protein and starch deposits.

The machine cleaning formulations according to the invention can be provided in liquid or solid form, in single-phase or multi-phase, as tablets or in the form of other metering units, in packaged or unpackaged form.

The polymers can be used either in multicomponent product systems (separate use of cleaner, rinse aid and regenerating salt), and also in those dishwashing detergents in which the functions of cleaner, rinse aid and regenerating salt are combined in one product (3-in-one products, 6-in-one products, 9-in-one products, all-in-one products).

A preferred embodiment of the mixtures according to the invention is given by a cleaning formulation for machine dishwashing comprising, as components:
 a) 1 to 20% by weight of at least one polymer according to the invention
 b) 0 to 50% by weight of complexing agents,
 c) 0 to 70% by weight of phosphates,
 d) 0 to 60% by weight of further builders and cobuilders,
 e) 0.1 to 20% by weight of nonionic surfactants,
 f) 0.1 to 30% by weight of bleaches and optionally bleach activators,
 g) 0 to 8% by weight of enzymes,
 h) 0 to 50% by weight of one or more further additives such as anionic or zwitterionic surfactants, alkali carriers, polymeric dispersants, corrosion inhibitors, antifoams, dyes, fragrances, fillers, organic solvents, tableting auxiliaries, disintegrants, thickeners, solubility promoters and water, the sum of the components from a) to h) giving 100% by weight.

A detailed description of components b) to h) can be found in WO 2008/13213 A1 and in DE 2007 006630 A1.

The components b) to h) are known to the person skilled in the art from the prior art and are described in general in WO 2008/13213 A1 and in DE 2007 006630 A1. Suitable complexing agents b) are described, for example, in WO 2008/13213 A1 pp. 24-26. The phosphates c) used are, for example, the substances described in WO 2008/13213 A1 pp. 18-21. Builders and cobuilders d) are understood, for example, as meaning the substances described in WO 2008/13213 A1 pp. 21-24 and in DE 2007 006630 A1 pp. 5-7. Suitable nonionic surfactants e) can be found by the person skilled in the art for example in DE 2007 006630 A1 pp. 9-12. Bleaches and bleach activators f) are well known to the person skilled in the art, for example from WO 2008/13213 A1 pp. 29-31. Examples of enzymes g) are described in WO 2008/13213 A1 pp. 26-29. The quantitative ratios of the individual components are adjusted by the person skilled in the art depending on the particular field of use of the cleaning formulation.

The invention further provides the use of the branched polyesters with sulfonate groups according to the invention, or mixtures thereof, as deposit inhibitors in water-conveying systems.

Water-conveying systems in which the polymers according to the invention can be used are, in particular, seawater desalination plants, cooling water systems and boiler-feed water systems and industrial process waters.

In general, the polymers according to the invention are added to the water-conveying systems in amounts of from 0.1 mg/l to 100 mg/l. The optimum dosing is governed by the requirements of the particular application and/or by the operating conditions of the particular process. For example, in the case of thermal seawater desalination, the polymers are preferably used in concentrations of 0.5 mg/l to 10 mg/l. In industrial cooling circulations or boiler-feed water systems, polymer concentrations up to 100 mg/l are used. Water analyses are often carried out in order to ascertain the proportion of deposit-forming salts and thus the optimum dosing.

Formulations which, besides the polymers according to the invention, and depending on requirements, can comprise inter alia phosphonates, polyphosphates, zinc salts, molybdate salts, organic corrosion inhibitors such as benzotriazole, tolyltriazole, benzimidazole or ethynylcarbinol alkoxylates, biocides, complexing agents and/or surfactants, can also be added to the water-conveying systems. Examples of phosphonates are 1-hydroxyethane-1,1-diphosphonic acid (HEDP), 2-phosphonobutane-1,2,4-tricarboxylic acid (PBTC), aminotrimethylenephosphonic acid (ATMP), diethylenetriaminepenta(methylenephosphonic acid) (DTPMP) and ethylenediaminetetra(methylenephosphonic acid) (EDTMP), which are used in each case in acid form or in the form of their sodium salts.

The invention further provides a method for producing branched polyesters with sulfonate groups, comprising the
1. reaction of the components A, B, optionally C and optionally D to give branched polyesters, where
   i. the component A is selected from the group of α,β-olefinically unsaturated dicarboxylic acids ($A_2$), and
   ii. the component B is selected from the group of di- or higher-functional alcohols ($B_y$),
   iii. the optional component C is selected from the group of di- or higher-functional carboxylic acids ($A_x$) and hydroxycarboxylic acids ($A_xB_y$) without α,β-olefinically unsaturated bonds,
   iv. the optional component D is selected from the compounds of the formula $CH_3(-O-CH_2-CH_2)_n-OH$, where n corresponds to an integer from the range from 2 to 40,
   with the proviso that
   if only difunctional alcohols ($B_2$) are selected as component B, the component C is present in the reaction (a.) and is selected from the group of tri- or higher-functional carboxylic acids ($A_x$) and hydroxycarboxylic acids ($A_xB_y$) without α,β-olefinically unsaturated bonds,
2. and the subsequent reaction of the branched polyesters obtained in (a.) with hydrogen sulfite, where the molar amount of hydrogen sulfite is at most 95 mol %, based on the amount of α,β-olefinically unsaturated dicarboxylic acid ($A_2$).

Step 1. of the method according to the invention can be carried out without dilution or in the presence of a solvent. Suitable solvents are, for example, hydrocarbons such as paraffins or aromatics. Particularly suitable paraffins are n-heptane and cyclohexane. Particularly suitable aromatics are toluene, ortho-xylene, meta-xylene, para-xylene, xylene as isomer mixture, ethylbenzene, chlorobenzene and ortho- and meta-dichlorobenzene. Also suitable as solvents in the absence of acidic catalysts are very particularly ethers, such as, for example, dioxane or tetrahydrofuran, and ketones such as, for example, methyl ethyl ketone and methyl isobutyl ketone.

According to the invention, the amount of added solvent is at least 0.1% by weight, based on the mass of the used starting materials to be reacted, preferably at least 1% by weight and particularly preferably at least 10% by weight. It is also possible to use excesses of solvent, based on the mass of used starting materials to be reacted, for example 1.01 to 10-fold. Solvent amounts of more than 100-fold, based on the mass of used starting materials to be reacted are not advantageous because at considerably lower concentrations of the reactants, the reaction rate diminishes considerably, which leads to uneconomically long reaction times.

In one preferred embodiment, the reaction is carried out free from solvents.

To carry out step 1. in the method according to the invention, it is possible to work in the presence of a water-withdrawing agent as additive, which is added at the start of the reaction. Molecular sieves, in particular molecular sieve 4 Å, $MgSO_4$ and $Na_2SO_4$, for example, are suitable. During the reaction, further water-withdrawing agent can also be added, or water-withdrawing agent can be replaced with fresh water-withdrawing agent. Water and/or alcohol formed during the reaction can also be distilled off, and, for example, it is possible to use a water separator in which the water is removed with the help of an entrainer.

Step 1. of the method according to the invention can be carried out in the absence of catalysts. However, preference is given to working in the presence of at least one catalyst. These are preferably acidic inorganic, organometallic or organic catalysts or mixtures of two or more acidic inorganic, organometallic or organic catalysts.

Within the context of this specification, acidic catalysts are also considered to be Lewis acids, i.e. those compounds according to Römpps Chemie-Lexikon, key word "Acid-base concept", which are able to accept an electron pair into the valence shell of one of their atoms.

For the purposes of the present invention, acidic inorganic catalysts are, for example, sulfuric acid, sulfates and hydrogen sulfates, such as sodium hydrogen sulfate, phosphoric acid, phosphonic acid, hypophosphorous acid, aluminum sulfate hydrate, alum, acidic silica gel (pH≤6, in particular ≤5) and acidic aluminum oxide. It is also possible to use, for example, aluminum compounds of the general formula $Al(OR^1)_3$ and titanates of the general formula $Ti(OR^1)_4$ as acidic inorganic catalysts, where the radicals $R^1$ can in each case be identical or different and are selected independently of one another from $C_1$-$C_{20}$-alkyl radicals, for example methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, 2-ethylhexyl, n-nonyl, n-decyl, n-dodecyl, n-hexadecyl or n-octadecyl.

$C_3$-$C_{12}$-Cycloalkyl radicals, for example cyclopropyl, cyclobutyl, cyclopentyl, cyclohexyl, cycloheptyl, cyclooctyl, cyclononyl, cyclodecyl, cycloundecyl and cyclododecyl; preference being given to cyclopentyl, cyclohexyl and cycloheptyl.

Preferably, the radicals $R^1$ in $Al(OR^1)_3$ and $Ti(OR^1)_4$ are in each case identical and selected from n-butyl, isopropyl, 2-ethylhexyl, n-octyl, decyl or dodecyl.

Preferred acidic organometallic catalysts are selected, for example, from dialkyltin oxides $R^1_2SnO$ or dialkyltin diesters $R^1_2Sn(OR^2)_2$, where $R^1$ is as defined above and can be identical or different.

$R^2$ can have the same meanings as $R^1$ and can additionally be $C_6$-$C_{12}$-aryl, for example phenyl, o-, m- or p-tolyl, xylyl or naphthyl. $R^2$ can in each case be identical or different.

Examples of organotin catalysts are tin(II) n-octanoate, tin(II) 2-ethylhexanoate, tin(II) laurate, dibutyltin oxide, diphenyltin oxide, dibutyltin dichloride, dibutyltin diacetate, dibutyltin dilaurate, tibutyltin dimaleate or dioctyltin diacetate. Also conceivable are organoantimony, organobismuth or organoaluminum catalysts.

Particularly preferred representatives of acidic organometallic catalysts are dibutyltin oxide, diphenyltin oxide and dibutyltin dilaurate.

Preferred acidic organic catalysts are acidic organic compounds with, for example, phosphate groups, sulfonic acid groups, sulfate groups or phosphonic acid groups. Particular preference is given to sulfonic acids such as, for example, para-toluenesulfonic acid. It is also possible to use acidic ion exchangers as acidic organic catalysts, for example polystyrene resins which contain sulfonic acid groups and are crosslinked with about 2 mol % of divinylbenzene.

It is also possible to use combinations of two or more of the aforementioned catalysts. It is possible as well to use those organic or organometallic or else inorganic catalysts which are present in the form of discrete molecules, in immobilized form, for example on silica gel or on zeolites.

If it is desired to use acidic inorganic, organometallic or organic catalysts, then the amount used is preferably 1 to 10 000 ppm of catalyst, particularly preferably 2 to 5000 ppm, based on the total mass of the hydroxy- and the carboxy-containing compounds.

If it is desired to use acidic inorganic, organometallic or organic catalysts, then the method is carried out in accordance with the invention at temperatures from 60 to 140° C. Preference is given to working at temperatures of from 80 to 140° C., particularly preferably at 100 to 130° C.

According to the invention, it is also possible to use enzymes as catalysts, although their use is less preferred.

Enzymes which can be used for this purpose are selected, for example, from hydrolases (E.C. 3.-.-.-), and among these particularly from the esterases (E.C. 3.1.-.-), lipases (E.C. 3.1.1.3), glycosylases (E.C. 3.2.-.-) and proteases (E.C. 3.4.-.-), in free form or in a form immobilized physically or chemically on a support, preferably lipases, esterases or proteases and particularly preferably esterases (E.C. 3.1.-.-). Very particular preference is given to Novozyme 435 (lipase from Candida antarctica B) or lipase from Alcaligenes sp., Aspergillus sp., Mucor sp., Penicilium sp., Geotricum sp., Rhizopus sp., Burkholderia sp., Candida sp., Pseudomonas sp., Thermomyces sp. or porcine pancreas, particular preference being given to lipase from Candida antarctica B or from Burkholderia sp. The enzymes listed are commercially available, for example from Novozymes Biotech Inc., Denmark.

The enzyme content in the reaction medium is generally in the range from about 0.1 to 10% by weight, based on the sum of the components used.

If it is desired to use enzymes as catalysts, then step 1. of the method is carried out in accordance with the invention at temperatures of 20 and up to 120° C., preferably 20 to 100° C. and particularly preferably 20 to 80° C.

If it is desired to use citric acid or sugar compounds and derivatives thereof in the polycondensation reaction, the reaction is carried out at temperatures of 60 to 140° C. Preference is given to working at temperatures of 80 to 130° C.

The method according to the invention is preferably carried out under inert-gas atmosphere, i.e. a gas which is inert under the reaction conditions, for example under carbon dioxide, combustion gases, nitrogen or noble gas, among which argon in particular is to be mentioned.

The pressure conditions of the method according to the invention are generally not critical. It is possible to work at significantly reduced pressure, for example at 10 to 500 mbar. The method according to the invention can also be carried out at pressures above 500 mbar. For reasons of simplicity, it is preferred to carry out the reaction at atmospheric pressure; however, it is also possible to carry it out at a slightly elevated pressure, for example up to 1200 mbar. It is also possible to work under significantly increased pressure, for example at pressures up to 10 bar. Preference is given to carrying out the reaction at reduced pressure or atmospheric pressure, particularly preferably at atmospheric pressure.

The reaction time of the method according to the invention is usually 10 minutes to 48 hours, preferably 30 minutes to 24 hours and particularly preferably 1 to 12 hours.

When the reaction in step 1. is complete, the highly functional branched polyesters can be isolated easily, for example by filtering off the catalyst and optionally stripping off the solvent, the stripping-off of the solvent usually being carried out at reduced pressure. Further highly suitable work-up methods are precipitation of the polymer following the addition of water and subsequent washing and drying.

If required, the reaction mixture can be subjected to a decoloration, for example by treatment with activated carbon or metal oxides, such as e.g. aluminum oxide, silicon oxide, magnesium oxide, zirconium oxide, boron oxide or mixtures thereof, in amounts of, for example, 0.1 to 50% by weight, preferably 0.5 to 25% by weight, particularly preferably 1 to 10% by weight, at temperatures of, for example, 10 to 140° C., preferably 20 to 130° C. and particularly preferably 30 to 120° C.

This can take place by adding the pulverulent or granular decoloring agent to the reaction mixture and subsequent filtration, or by passing the reaction mixture over a bed of a decoloring agent in the form of any desired suitable moldings.

The decoloration of the reaction mixture can take place at any desired point in the work-up process, for example at the stage of the crude reaction mixture or following optionally carried out prewashing, neutralization, washing or solvent removal.

The reaction mixture can also be subjected to a prewashing and/or a neutralization and/or a post-washing, preferably only to a neutralization. Optionally, the order of neutralization and prewashing can also be swapped.

From the aqueous phase of the washing and/or neutralization it is possible to recover, at least partially, any valuable products present by acidification and extraction with a solvent, and to use them afresh.

In terms of processing, all extraction and washing processes and apparatuses known per se can be used for a washing or neutralization in the method according to the invention, e.g. those which are described in Ullmann's Encyclopedia of Industrial Chemistry, 6th ed., 1999 Electronic Release, Chapter: Liquid-Liquid Extraction—Apparatus. For example, these may be single-stage or multi-stage, preferably single-stage, extractions, and also those in cocurrent or countercurrent operation, preferably countercurrent operation.

However, in a preferred embodiment, it is possible to dispense with a washing, neutralization and decoloring.

Step 2. of the method according to the invention for the sulfonation of the polyester can be carried out without dilution or in the presence of a solvent. Suitable solvents are, for example, water or alcohols.

The amount of added solvent according to the invention is at least 0.1% by weight, based on the mass of the used starting materials to be reacted, preferably at least 1% by weight and particularly preferably at least 10% by weight. It is also possible to use excesses of solvent, based on the mass of used starting materials to be reacted, for example 1.01 to 10-fold. Solvent amounts of more than 100-fold, based on the mass of used starting materials to be reacted, are not advantageous because, at significantly lower concentrations of the reactants, the rate of reaction diminishes considerably, which leads to uneconomically long reaction times.

Step 2. of the method according to the invention is carried out at temperatures from 60 to 150° C. Preference is given to working at temperatures of from 80 to 120° C., particularly preferably at from 90 to 110° C.

Preferably, the polyester is introduced as initial charge as stirable melt at reaction temperature, and is then admixed with an aqueous solution of the sulfonating reagent.

Sulfonating reagents which can be used are solutions of the alkali metal or alkaline earth metal salts of sulfuric acid (hydrogen sulfites). The concentration of the solutions is from 10 to 90% by weight, preferably from 20 to 50% by weight and very particularly preferably from 30 to 45% by weight.

Preference is given to using aqueous solutions of sodium hydrogen sulfite, potassium hydrogen sulfite or magnesium hydrogen sulfite. Very particular preference is given to aqueous solutions of sodium hydrogen sulfite.

Alternatively, it is possible to use an acidic aqueous solution of sodium thiosulfate, which disproportionates into hydrogen sulfite.

The reaction time in step 2. of the method according to the invention is usually 10 minutes to 48 hours, preferably 30 minutes to 24 hours and particularly preferably 1 to 3 hours.

The reaction is complete when hydrogen sulfite can no longer be detected in the reaction mixture. During the conversion, the consumption of the hydrogen sulfite in the reaction mixture can be monitored qualitatively or quantitatively.

Of suitability for the qualitative monitoring is, for example, the treatment of a sample of the reaction mixture with dilute potassium permanganate solution and subsequent addition of barium chloride solution. Any hydrogen sulfite present here is firstly oxidized by permanganate to sulfate, which, upon contact with barium ions, precipitates out as sparingly soluble barium sulfate. It should be taken into consideration that the detection can be disturbed by the reaction of the potassium permanganate with maleic acid double bonds.

Of suitability for the quantitative monitoring of the reaction is an iodometric determination of the sulfite, as described, for example, in Gerhard Schulze, Jürgen Simon "Jander/Jahr Maßanalyse", 17th edition 2009, de Gruyter, Berlin, p. 187.

The present invention makes available branched polyesters with sulfonate groups which, even on account of the high density of carboxylic acids, carboxylates and/or sulfonates, can be used for cleaning purposes and for water treatment purposes and which are nevertheless readily biodegradable. These polymeric effect substances, which have a low toxicity, can be prepared by means of a technically relatively simple and cost-effective method and can be readily incorporated into formulations for cleaning purposes in their various presentation forms.

The invention is illustrated in more detail by the examples, without the examples limiting the subject matter of the invention.

EXAMPLES

MA=maleic anhydride
TMP=trimethylolpropane
TMP×n EO=reaction product of TMP with
n molar excess of ethylene oxide
ASA=octadecenylsuccinic acid
CA=citric acid monohydrate
DBTL=dibutyltin dilaurate
Ti(OBu)$_4$=titanium tetrabutylate
*x % NaHSO$_3$ means that in the sulfonation reaction the amount of NaHSO$_3$ has been used which is required to sulfonate x % of α,β-olefinically unsaturated double bonds theoretically present in the polymer.

The molecular weights of the unsulfonated polyesters were determined by gel permeation chromatography (GPC) (column combination: 2×PLgel 3 µm MIXED-E and 1× ResiPore 3 µm; standard: polymethyl methacrylate (PMMA); eluent: THF).

The acid numbers (mg KOH/g polymer) were determined in accordance with DIN 53402.

Example 1

Polymer 1: MA: TMP×12 EO
44.7 g of MA and 255.2 g of TMP×12 EO were weighed into a 500 ml round flask equipped with stirrer, internal thermometer, gas inlet tube and descending condenser with capture vessel, and heated to 160° C. with stirring until a homogeneous melt had formed. Then, 0.1 g of DBTL was added and the reaction mixture was stirred for 8 h at 160° C. while separating off water of reaction until the GPC control showed a weight-average molecular weight of 6900 g/mol. The reaction was then completed by cooling to room temperature.

The product was obtained in the form of a yellow water-soluble resin.

The following characteristic data were determined:
acid number=47 mg KOH/g polymer
$M_n$=1660 g/mol, $M_w$=8740 g/mol
Sulfonated Polymer 1a: (MSA: TMP×12 EO)*25% NaHSO$_3$ 150 g of Polymer 1 and 15.3 g of aqueous NaHSO₃ solution (39% strength) were weighed into a 500 ml round flask equipped with stirrer, internal thermometer, gas inlet tube and reflux condenser, heated to 100° C. with stirring and held at the temperature until the hydrogen sulfite detection in the reaction mixture was negative. The reaction mixture was then cooled to room temperature and adjusted to a pH of pH=7 using 50% strength aqueous potassium hydroxide solution. The reaction mixture was transferred to an aluminum dish and dried by drying in a vacuum drying cabinet (70° C.).

The product was obtained in the form of a yellow water-soluble resin.

The following characteristic data were determined:
acid number=8 mg KOH/g polymer Example 2

Polymer 2: MA: TMP×12 EO: ASA 137 g of MA, 491.4 g of ASA and 1875.7 g TMP×12 EO were weighed into a 500 ml round flask equipped with stirrer, internal thermometer, gas inlet tube and descending condenser with capture vessel, and heated to 170° C. with stirring until a homogeneous melt had formed. Then, 0.75 g of Ti(OBu)₄ was added and the reaction mixture was stirred for 11 h at 170-180° C. while separating off water of reaction until the GPC control showed a weight-average molecular weight of 5900 g/mol. The reaction was then completed by cooling to room temperature.

The product was obtained in the form of a yellowish water-insoluble resin.

The following characteristic data were determined:
acid number=33 mg KOH/g polymer $M_n$=650 g/mol, $M_w$=6400 g/mol Sulfonated Polymer 2a: (MA: TMP×12 EO: ASA)*25% NaHSO₃

1001 g of Polymer 2 and 77.3 g of aqueous NaHSO₃ solution (39% strength) were weighed into a 2000 ml round flask equipped with stirrer, internal thermometer, gas inlet tube and reflux condenser, heated to 100° C. with stirring and held at the temperature until the hydrogen sulfite detection in the reaction mixture was negative. The reaction mixture was then cooled to room temperature and adjusted to a pH of pH=7 using 50% strength aqueous potassium hydroxide solution. The reaction mixture was transferred to an aluminum dish and dried by drying in a vacuum drying cabinet (70° C.).

The product was obtained in the form of a yellow water-soluble and wax-like solid.

The following characteristic data were determined:
acid number=16 mg KOH/g polymer Example 3

Polymer 3: CA: MA: TMP 68.8 g of MA, 443 g of CA and 189.1 g of TMP were weighed into a 1000 ml round flask equipped with stirrer, internal thermometer, gas inlet tube and descending condenser with capture vessel and heated to 130° C. with stirring until a homogeneous melt had formed. Then, 0.21 g of Ti(OBu)₄ was added and the reaction mixture was stirred for 3 h at 130° C. while separating off water of reaction until the GPC control showed a weight-average molecular weight of 6400 g/mol. The reaction was then completed by cooling to room temperature.

The product was obtained in the form of a colorless water-insoluble amorphous solid.

The following characteristic data were determined:
acid number=367 mg KOH/g polymer $M_n$=120 g/mol, $M_w$=9760 g/mol Sulfonated Polymer 3a: (CA: MA: TMP)*30% NaHSO₃:

150 g of Polymer 3 and 12 g of aqueous NaHSO₃ solution (39% strength) were weighed into a 250 ml round flask equipped with stirrer, internal thermometer, gas inlet tube and reflux condenser, heated to 100° C. with stirring and stirred for 5 h at this temperature. The reaction mixture was then cooled to room temperature and adjusted to a pH of pH=5 using 50% strength aqueous potassium hydroxide solution. The reaction mixture was transferred to an aluminum dish and dried by drying in a vacuum drying cabinet (70° C.).

The product was obtained in the form of a yellow water-soluble and wax-like solid.

Sulfonated Polymer 3b: (CA: MA: TMP)*60% NaHSO₃

100 g of Polymer 3 and 16 g of aqueous NaHSO₃ solution (39% strength) were weighed into a 250 ml round flask equipped with stirrer, internal thermometer, gas inlet tube and reflux condenser, heated to 100° C. with stirring and stirred for 5 h at this temperature. The reaction mixture was then cooled to room temperature and adjusted to a pH of pH=5 using 50% strength aqueous potassium hydroxide solution. The reaction mixture was transferred to an aluminum dish and dried by drying in a vacuum drying cabinet (70° C.).

The product was obtained in the form of a yellow water-soluble and wax-like solid.

Sulfonated Polymer 3c: (CA: MA: TMP)*90% NaHSO₃

1008 g of Polymer 3 and 24 g of aqueous NaHSO₃ solution (39% strength) were weighed into a 2000 ml round flask equipped with stirrer, internal thermometer, gas inlet tube and reflux condenser, heated to 100° C. with stirring and stirred for 5 h at this temperature. The reaction mixture was then cooled to room temperature and adjusted to a pH of pH=5 using 50% strength aqueous potassium hydroxide solution. The reaction mixture was transferred to an aluminum dish and dried by drying in a vacuum drying cabinet (70° C.).

The product was obtained in the form of a yellow water-soluble and wax-like solid.

Example 4

Calcium Carbonate—Inhibition Test

A solution of NaHCO₃, Mg₂SO₄, CaCl₂ and polymer is shaken for 2 h at 70° C. in a water bath. After filtering the still-warm solution through a 0.45 μm Milex filter, the Ca content of the filtrate is determined by complexometry or by means of a $Ca^{2+}$-selective electrode and, by means of a before/after comparison, the CaCO₃ inhibition is determined in % (see formula I).

| | |
|---|---|
| $Ca^{2+}$ | 215 mg/l |
| $Mg^{2+}$ | 43 mg/l |
| $HCO_3^-$ | 1220 mg/l |
| $Na^+$ | 460 mg/l |
| $Cl^-$ | 380 mg/l |
| $SO_4^{2-}$ | 170 mg/l |
| Polymer | 10 mg/l |
| Temperature | 70° C. |
| Time | 2 hours |
| pH | 8.0-8.5 |

CaCO₃ inhibition (%)=mg ($Ca^{2+}$) after 24 h-mg ($Ca^{2+}$) blank value after 24 h/mg ($Ca^{2+}$) zero value-mg ($Ca^{2+}$) blank value after 24 h×100

TABLE 1

| Example | Inhibition [%] |
|---|---|
| 1 | 40.8 |
| 1a | 49.2 |
| 2 | 47.5 |
| 2a | 61.5 |
| 3 | 35.8 |
| 3a | 44.8 |
| 3b | 52.3 |
| 3c | 59.8 |

The polymers were tested in the following phosphate-free formulations PF1 and PF2, and also in the phosphate-based formulation P1. The composition of the polymers is shown in Table 3 (data in % by weight).

TABLE 2

|  | PF 1 | PF 2 | P1 |
|---|---|---|---|
| Protease | 1 | 1 | 1 |
| Amylase | 0.2 | 0.2 | 0.2 |
| Nonionic surfactant | 5 | 5 | 3 |
| Polymer | 10 | 10 | 6.5 |
| Sodium percarbonate | 10.5 | 10.5 | 14 |
| Tetraacetylethylenediamine | 4 | 4 | 4 |
| Sodium disilicate | 2 | 2 | 2 |
| Sodium tripolyphosphate |  |  | 50 |
| Sodium carbonate | 18.8 | 18.8 | 18.8 |
| Sodium citrate dihydrate | 33 | 48 |  |
| Methylglycinediacetic acid | 15 | 0 |  |
| Hydroxyethane-(1,1-diphosphonic acid) | 0.5 | 0.5 | 0.5 |

Data in % by weight based on the total amount of all components

Here, the following experimental conditions were observed:

Dishwasher: Miele G 1222 SCL
Program: 65° C. (with prewash)
Ware: 3 knives (WMF Tafelmesser Berlin, monoblock)
3 drinking glasses Amsterdam 0.2 l
3 BREAKFAST PLATES "OCEAN BLUE" (melamine)
3 porcelain plates: RIMMED PLATES FLAT 19 cm
Arrangement: Knives in the cutlery drawer, glasses in the upper basket, plates in the lower basket
Dishwashing detergent: 21 g
Addition of soiling: 50 g of ballast soiling is defrosted and metered in with the formulation after the prewash; for composition see below
Clear-rinse temperature: 65° C.
Water hardness: 21° German hardness (Ca/Mg):HCO3 (3:1):1.35
Wash cycles: 15; break in between for 1 h in each case (10 min with door open, 50 min with door closed)
Evaluation: Visually after 15 wash cycles The evaluation of the ware was carried out after 15 cycles in a darkened chamber under light behind an apertured diaphragm.
Composition of the ballast soiling:
Starch: 0.5% potato starch, 2.5% gravy
Grease: 10.2% margarine
Protein: 5.1% egg yolk, 5.1% milk
Others: 2.5% tomato ketchup, 2.5% mustard, 0.1% benzoic acid, 71.4% water
Result:

The formulations with polymer are characterized in particular by their very high deposit-inhibiting effect towards inorganic and organic deposits on glass, knives, porcelain and plastic parts. Furthermore, they increase the cleaning power of the dishwashing detergent and favor the run-off of the water from the ware, so that particularly clear glasses and shiny metal cutlery items are obtained.

The invention claimed is:

1. A mixture comprising a branched polyester, comprising: a sulfonate group,
   wherein the polyester is obtained by a process comprising reacting components A, B, optionally C, and optionally D, and subsequently reacting with at most 95 mol % hydrogen sulfite, based on an amount of α,β-olefinically unsaturated dicarboxylic acid ($A_2$),
   the component A is an α,β-olefinically unsaturated dicarboxylic acid ($A_2$),
   the component B is a di- or higher-functional alcohol ($B_y$),
   the optional component C if present is a di- or higher-functional carboxylic acid ($A_x$) or hydroxycarboxylic acid ($A_xB_y$) without α,β-olefinically unsaturated bonds, and
   the optional component D if present is of formula $CH_3(-O-CH_2-CH_2)_n-OH$, where n is an integer of from 2 to 40,
   with the proviso that
   if component B is only difunctional alcohol ($B_2$) without higher-functional alcohol, the component C is present in reacting components A and B and component C is a tri- or higher-functional carboxylic acid ($A_x$) or tri- or higher-functional hydroxycarboxylic acid ($A_xB_y$) without α,β-olefinically unsaturated bonds
   wherein said mixture is a cleaner, a rinse, a detergent, or a formulation suitable for water treatment,
   and wherein a fraction of tri- or higher functional components B and if present C in said mixture with said difunctional components B and if present C is from 70 to 100 mol %.

2. The mixture according to claim 1, wherein the α,β-olefinically unsaturated dicarboxylic acid ($A_2$) is maleic acid, itaconic acid, fumaric acid, citraconic acid, mesaconic acid, glutaconic acid, or any combination thereof.

3. The mixture according to claim 1, where the di- or higher-functional alcohol ($B_y$) is ethylene glycol, propane-1,2-diol, propane-1,3-diol, butane-1,2-diol, butane-1,3-diol, butane-1,4-diol, butane-2,3-diol, pentane-1,2-diol, pentane-1,3-diol, pentane-1,4-diol, pentane-1,5-diol, pentane-2,3-diol, pentane-2,4-diol, hexane-1,2-diol, hexane-1,3-diol, hexane-1,4-diol, hexane-1,5-diol, hexane-1,6-diol, hexane-2,5-diol, heptane-1,2-diol, 1,7-heptanediol, 1,8-octanediol, 1,2-octanediol, 1,9-nonanediol, 1,2-decanediol, 1,10-decanediol, 1,2-dodecanediol, 1,12-dodecanediol, 1,5-hexadiene-3,4-diol, 1,2-cyclopentanediol, 1,3-cyclopentanediol, 1,2-cyclohexanediol, 1,3-cyclohexanediol, 1,4-cyclohexanediol, 1,1-bis(hydroxymethyl)-cyclohexane, 1,2-bis(hydroxymethyl)-cyclohexane, 1,3-bis(hydroxymethyl)-cyclohexane, 1,4-bis(hydroxymethyl)-cyclohexane, 1,1-bis(hydroxyethyl)cyclohexane, 1,2-bis(hydroxyethyl)cyclohexane, 1,3-bis(hydroxyethyl)cyclohexane, 1,4-bis(hydroxyethyl)cyclohexane, neopentyl glycol, (2)-methyl-2,4-pentanediol, 2,4-dimethyl-2,4-pentanediol, 2-ethyl-1,3-hexanediol, 2,5-dimethyl-2,5-hexanediol, 2,2,4-trimethyl-1,3-pentanediol, pinacol, diethylene glycol, triethylene glycol, isosorbide, dipropylene glycol, tripropylene glycol, polyethylene glycol $HO(CH_2CH_2O)_n-H$ wherein n is an integer of at least 4, polypropylene glycol $HO(CH[CH_3]CH_2O)_n-H$ wherein n is an integer of at least 4, polyethylene polypropylene glycol wherein an order of ethylene oxide or propylene oxide units is blockwise or random, polytetramethylene glycol, poly-1,3-propanediol with a molecular weight of up to 5000 g/mol, polycaprolactone with a molecular weight of up to 5000 g/mol, glycerol, trimethylolethane, trimethylpropane, bis(trimethylolpropane), 1,2,4-butanetriol, pentaerythritol, diglycerol, triglycerol or a higher condensation product of glycerol, di(trimethylolpropane), di(pentaerythritol), sugar, sugar alcohol, a tri- or higher-functional polyetherol based on a tri- or higher-functional alcohol obtained by reaction with ethylene oxide or propylene oxide or butylene oxide or any combination thereof, a tri- or higher-functional polyesterol based on a tri- or higher-functional alcohol obtained by reaction with caprolactone, or any combination thereof.

4. The mixture according to claim 1,
wherein the reacting components A, B, optionally C, and optionally D comprises reacting, as a di- or higher-functional carboxylic acid ($A_x$) without α,β-olefinically unsaturated bonds, an aliphatic dicarboxylic acid, an aromatic dicarboxylic acid, or any combination thereof, wherein a dicarboxylic acid is optionally a substituted trimellitic acid or a derivative thereof.

5. The mixture according to claim 1, wherein the reacting components A, B, optionally C, and optionally D comprises reacting, as a hydroxycarboxylic acid ($A_xB_y$) without α,β-olefinically unsaturated bonds, citric acid, hydroxyacetic acid, hydroxypropionic acid, hydroxyvaleric acid, hydroxysuccinic acid, tartaric acid, isocitric acid, dimethylolpropionic acid, dimethylolbutyric acid, or any combination thereof.

6. The mixture according to claim 1, where a number of different components A, B, and C in the reacting components A, B, optionally C, and optionally D is less than or equal to 4.

7. The mixture according to claim 1, wherein an amount of component A is greater than 20 mol %, based on a total amount of carboxylic acids of components A and C together.

8. A process of making a rinse, cleaner, or detergent, the process comprising:
making the rinse, cleaner, or detergent with the mixture comprising a branched polyester according to claim 1.

9. The process according to claim 8, wherein the rinse, cleaner, or detergent is a dishwashing detergent.

10. A method for producing the mixture comprising a branched polyester according to claim 1 with a sulfonate group, the method comprising:
reacting components A, B, optionally C, and optionally D to obtain a branched polyester,
and subsequently reacting the branched polyester with at most 95 mol % hydrogen sulfite, based on an amount of α,β-olefinically unsaturated dicarboxylic acid ($A_2$),
wherein the component A is an α,β-olefinically unsaturated dicarboxylic acid ($A_2$),
the component B is a di- or higher-functional alcohol (By),
the optional component C if present is a di- or higher-functional carboxylic acid ($A_x$) or hydroxycarboxylic acid ($A_xB_y$) without α,β-olefinically unsaturated bonds,
the optional component D if present is of formula $CH_3$(—O—$CH_2$—$CH_2$)$_n$—OH, where n is an integer from 2 to 40,
with the proviso that
if component B is only difunctional alcohol ($B_2$) without higher-functional alcohol, the component C is present in reacting components A and B and component C is-a tri- or higher-functional carboxylic acid ($A_x$) or tri- or higher-functional hydroxycarboxylic acid ($A_xB_y$) without α,β-olefinically unsaturated bonds.

\* \* \* \* \*